United States Patent [19]

Willis et al.

[11] 3,927,132

[45] Dec. 16, 1975

[54] PROCESS FOR PRODUCING 1,1,1-TRICHLOROETHANE

[75] Inventors: Gordon G. Willis; John B. Ivy; Theodore S. Boozalis; Darryl E. Cragar, all of Lake Jackson, Tex.

[73] Assignee: The Dow Chemical Company, Midland, Mich.

[22] Filed: Apr. 22, 1974

[21] Appl. No.: 462,702

[52] U.S. Cl. ............................................. 260/658 R
[51] Int. Cl.² ........................................ C07C 17/10
[58] Field of Search ........ 260/654 R, 658 R, 654 H, 260/654 S, 652 P

[56] References Cited
UNITED STATES PATENTS

| | | | |
|---|---|---|---|
| 3,012,081 | 12/1961 | Conrad et al. | 260/658 R |
| 3,059,035 | 10/1962 | Benner et al. | 260/658 R |

Primary Examiner—Delbert E. Gantz
Assistant Examiner—Joseph A. Boska
Attorney, Agent, or Firm—Glwynn R. Baker

[57] ABSTRACT

A process for the separation of 1,1-dichloroethane from cis- and trans-1,2-dichloroethylene by the direct distillation of the trans-1,2-dichloroethylene, which boils approximately 10° lower than the 1,1-dichloroethane and cis-1,2-dichloroethylene, away from the latter two and the subsequent isomerization of the cis-1,2-dichloroethylene, at a temperature approximately 500°C, to establish an equilibrium mixture of cis- and trans-isomer. The resulting cis- and trans-isomer mixture is subjected to distillation and the separation of the trans- from the cis- and the recycle of the cis- to the isomerization step. This process has utility in the preparation of 1,1,1-trichloroethane from ethyl chloride. In such a process as the direct thermal chlorination of ethyl chloride to 1,1,1-trichloroethane there are produced numerous by-products, most of which are separable by simple distillation from the 1,1-dichloroethane. However, the cis-isomer boils so close to 1,1-dichloroethane that it is practically inseparable unless rigid purification techniques of distillation are employed. The process of the present invention provides a convenient method for the simple distillation of the single product trans-1,2-dichloroethylene from the mixture of cis-, trans- and intermediate 1,1-dichloroethane stream from a thermal chlorination of ethylchloride to 1,1,1-trichloroethane and permits the recycle of the 1,1-dichloroethane with such cis-isomer to the reactor which operates under reaction conditions that the cis-isomer is isomerized to an equilibrium mixture with trans-isomer. The repeated recycling of the cis-isomer with the recycled 1,1-dichloroethane permits the thermal chlorination reactor to product 1,1,1-trichloroethane in high yields by preventing the cis- and trans-isomers of 1,2-dichloroethylene from building up to an unacceptable level in the recycled 1,1-dichloroethane.

1 Claim, No Drawings

PROCESS FOR PRODUCING 1,1,1-TRICHLOROETHANE

BRIEF DESCRIPTION OF THE INVENTION

The present invention employs a technique of simple distillation of trans-1,2-dichloroethylene from a mixture of cis- and trans-1,2-dichloroethylene and 1,1-dichloroethane. The trans- isomer boils approximately 10° below the boiling point of 1,1-dichloroethane and approximately 13° below the boiling point of the cis-isomer; thus, upon the separation of the fraction containing both cis- and trans-dichloroethylene and 1,1-dichloroethane from the product stream from the reactor there is obtained a mixture which is capable of separation of trans- isomer from the mixture. The resulting mixture of cis-1,2-dichloroethylene and 1,1-dichloroethane can then be recycled to a reactor wherein the temperature is in the range of approximately 400°C to about 600°C, and preferably about 500°C. Under this condition of temperature and in the presence of the 1,1-dichloroethane, ethyl chloride and chlorine there is obtained an isomerization of the cis-isomer to an equilibrium mixture of cis- and trans-isomers. The resulting effluent of this reaction mixture, passed to a simple distillation column, separates the effluent into several fractions of which of course there is obtained the cis-, trans- mixture with 1,1-dichloroethane. This three-component mixture can be separated by a fairly simple distillation column to produce trans-dichloroethylene and a mixture of cis-1,2-dichloroethylene and 1,1-dichloroethane. This resulting 1,1-dichloroethane and cis-1,2-dichloroethylene is recycled to the thermal chlorinator wherein the cis-isomer is isomerized and the 1,1-dichloroethane chlorinated, producing a useful product, 1,1,1-trichloroethane. The ethyl chloride which is fed to the thermal chlorinator along with this recycled 1,1-dichloroethane produces of course 1,1-dichloroethane in the effluent.

DETAILED DESCRIPTION OF THE INVENTION

In the production of 1,1-dichloroethane by the direct thermochlorination of ethyl chloride and the recycle of that so-produced 1,1-dichloroethane to the same thermal chlorination reactor there is simultaneously produced 1,1,1-trichloroethane and vinylidene chloride, very desirable products. The 1,1-dichloroethane which is produced by the chlorination of ethyl chloride in this reaction is not readily separable from impurities, primarily cis- and trans-1,2-dichloroethylene. It is well known that 1,2-dichloroethylene in the trans- form boils at approximately 10° lower than the 1,1-dichloroethane and thus is capable of separation in a still from a mixture of cis- and trans-dichloroethane and 1,1-dichloroethane. If the trans-isomer is removed from the mixture of cis- and trans-dichloroethylene and 1,1-dichloroethane, there is resulting a two-component mixture of 1,1-dichloroethane and cis-dichloroethylene which can be fed back to the thermochlorinator wherein the 1,1-dichloroethane is thermally chlorinated to 1,1,1-trichloroethane and vinylidene chloride. Under the conditions of the chlorination reaction, that is, in the presence of chlorine and at a temperature of above about 400°C, the cis- isomer will isomerize to an equilibrium mixture of approximately 60% cis- isomer and 40% trans- isomer. Thus, it is apparent if the trans-isomer is removed from combination with the 1,1-dichloroethane and cis- isomer that upon recycle to the reactor the cis- isomer being re-isomerized to the 60/40 mixture with the trans- there results a continuous reduction in amount of trans- isomer from the system. Such control of these isomers will effect favorably the reaction of 1,1-dichloroethane and ethyl chloride taking place in the chlorinating reactor and will markedly reduce the quantity of the cis- and trans- isomers as well as reduce the amount of more highly chlorinated chlorohydrocarbon such as tetrachloroethane, perchloroethylene or trichloroethylene.

In the following example a synthetic mixture of chlorine, 1,1-dichloroethane, ethyl chloride and cis-dichloroethylene along with HCl which would be the approximate feed from a commercial operation in which ethyl chloride and 1,1-dichloroethane are chlorinated and the 1,1-dichloroethane is recycled to produce in the same chlorination reactors, simultaneously with the chlorination of the ethyl chloride, 1,1,1-trichloroethane and vinylidene chloride. The cis-dichloroethane concentration of the feed component was altered from 0 to 2.1 moles per hour in an overall feed of approximately 52 to 54 total moles per hour. The reactor temperature and other reaction conditions are set forth below. The effluent product from the chlorination reactor was separated into several fractions one of which was a trans-, cis-trichloroethylene fraction which contained the majority of the 1,1-dichloroethanes produced in the thermochlorination. This fraction was separated into "cis" and 1,1-dichloroethane and a trans-fraction which latter fraction was removed. The resulting mixture of cis- and 1,1-dichloroethane were then recycled to the thermochlorinator. Thus, according to this process, employing the artificial feed, several examples were run in which the concentration of the cis-dichloroethylene was changed. In the tabular form below, the reactor conditions of the feed in moles per hour are set forth. In the table following the tabular form of conditions and reactants, the product effluent analysis is set forth for each of the feeds of cis-dichloroethylene fed per mole hour.

TABLE

THERMAL ISOMERIZATION OF CIS-DICHLOROETHYLENE

| | | |
|---|---|---|
| Reactor Temperature, °C | | 475 |
| Chlorine Preheater, °C | | 200 |
| RCl Preheater, °C | | 200 |
| Reactor Pressure, psig | | 40 |
| Reactor Volume, liter | | 0.46 |
| Contact Time, sec. | | 0.6 |
| Feed, mole/hour | | |
| Chlorine | | 20.8 |
| 1,1-Dichloroethane | | 9.6 |
| Ethyl Chloride | | 14.4 |
| cis-Dichloroethylene | | 0–1.1–2.1 |
| HCl-Diluent | | 8.0 |

| cis-Dichloroethylene, mole/hour | 0 | 1.1 | 2.1 |
|---|---|---|---|
| PRODUCT ANALYSIS | mole % | mole % | mole % |
| Ethylene | 14.7 | 14.5 | 13.6 |
| Vinyl Chloride | 20.5 | 21.7 | 21.1 |
| Ethyl Chloride | 4.47 | 2.89 | 2.55 |
| Vinylidene Chloride | 6.52 | 7.84 | 7.49 |
| trans-Dichloroethylene | 0.55 | 2.42 | 4.04 |
| 1,1-Dichloroethane | 26.4 | 21.3 | 20.6 |
| 1,1,1-Trichloroethane | 22.4 | 22.5 | 21.6 |
| cis-Dichloroethylene | 0.76 | 3.37 | 5.51 |
| Ethylene Dichloride | 1.73 | 1.70 | 1.66 |
| Perchloroethylene | — | 0.05 | 0.09 |
| 1,1,2-Trichloroethane | 1.67 | 1.43 | 1.48 |
| cis:trans | 58.0: | 58.2: | 57.7: |

TABLE-continued

THERMAL ISOMERIZATION OF CIS-DICHLOROETHYLENE

| 42.0 | 41.8 | 42.3 |
|------|------|------|

The following example demonstrates the buildup of cis- and trans-dichloroethane in a chlorination reactor in the commonly employed process wherein the cis-and trans-isomers are not removed from association with the 1,1-dichloroethane which is recycled to the chlorination reactor.

RECYCLE OF CIS- AND TRANS-DICHLOROETHYLENES

| | | | | | |
|---|---|---|---|---|---|
| REACTOR TEMPERATURE, °C | 475 | | | | |
| REACTOR PRESSURE, PSIG | 40 | | | | |
| CHLORINE PREHEAT, °C | 200 | | | | |
| RCl PREHEAT, °C | 200 | | | | |
| FEED, MOLE/HOUR | RUN NO. 78 | RUN NO. 79 | RUN NO. 80 | RUN NO. 81 | RUN NO. 82 |
| CHLORINE | 22.8 | 22.8 | 22.8 | 22.8 | 22.8 |
| ETHYL CHLORIDE | 14.4 | 14.4 | 14.4 | 14.4 | 14.4 |
| 1,1-DICHLOROETHANE | 9.6 | 9.6 | 9.6 | 9.6 | 9.6 |
| HYDROGEN CHLORIDE | 8.0 | 8.0 | 8.0 | 8.0 | 8.0 |
| CIS- AND TRANS-DICHLOROETHYLENE | 0 | 0.6 | 1.2 | 2.4 | 4.8 |
| *CIS- AND TRANS-DICHLOROETHYLENE, MOLE % | 0 | 2.5 | 5.0 | 10.0 | 20.0 |
| REACTOR EFFLUENT | MOLE % | MOLE % | MOLE % | MOLE % | MOLE % |
| ETHYLENE | 12.78 | 12.69 | 10.29 | 10.02 | 7.68 |
| VINYL CHLORIDE | 26.39 | 25.77 | 25.59 | 22.89 | 17.96 |
| ETHYL CHLORIDE | 1.14 | 1.15 | 0.59 | 0.79 | 0.65 |
| VINYLIDENE CHLORIDE | 13.08 | 12.53 | 16.39 | 13.41 | 10.84 |
| TRANS-DICHLOROETHYLENE | 1.25 | 2.25 | 3.77 | 5.42 | 7.80 |
| 1,1-DICHLOROETHANE | 14.81 | 14.53 | 9.87 | 11.60 | 11.14 |
| 1,1,1-TRICHLOROETHANE | 23.96 | 23.23 | 21.95 | 21.65 | 22.78 |
| CIS-DICHLOROETHYLENE | 2.13 | 3.85 | 6.13 | 8.61 | 12.62 |
| TRICHLOROETHYLENE | 0.93 | 1.02 | 1.87 | 2.00 | 2.63 |
| ETHYLENE DICHLORIDE | 0.86 | 0.96 | 0.90 | 0.90 | 0.90 |
| PERCHLOROETHYLENE | 0.08 | 0.08 | 0.25 | 0.20 | 1.08 |
| 1,1,2-TRICHLOROETHYLENE | 1.76 | 1.44 | 1.50 | 1.56 | 2.56 |
| UNSYM-TETRACHLOROETHANE | 0.84 | 0.50 | 0.87 | 0.95 | 1.61 |
| CIS- AND TRANS-DICHLOROETHYLENE | 3.38 | 6.10 | 9.90 | 14.03 | 20.42 |
| ΔCIS- AND TRANS-DICHLOROETHYLENE | — | 2.72 | 6.52 | 10.65 | 17.04 |

*Based on moles RCl fed.

We claim:

1. In a method for chlorinating ethyl chloride and 1,1-dichloroethane to produce 1,1,1-trichloroethane, 1,1-dichloroethane, vinylidene chloride and numerous by-products and in which process the 1,1-dichloroethane is recycled to the chlorination reaction along with cis- and trans- 1,2-dichloroethylene the improvement which comprises separating the trans-1,2-dichloroethylene away from the cis-1,2-dichloroethylene and 1,1-dichloroethane, the recycled cis-1,2-dichloroethylene being isomerized to an isomeric mixture of about 60% cis- and 40% trans-1,2-dichloroethylene during the chlorination of the 1,1-dichloroethane and ethyl chloride.

* * * * *